March 18, 1941.                E. T. PUTNAM                 2,235,113
           FACE BLOCK FOR BUILDINGS AND METHOD OF MAKING SAME
                           Filed May 21, 1936

INVENTOR.
                                          ERLE T. PUTNAM.
                                    BY
                                                ATTORNEY.

Patented Mar. 18, 1941

2,235,113

UNITED STATES PATENT OFFICE 2,235,113

FACE BLOCK FOR BUILDINGS AND METHOD OF MAKING SAME

Erle T. Putnam, Detroit, Mich., assignor to Libbey-Owens-Ford Glass Company, Toledo, Ohio Application May 21, 1936, Serial No. 81,064

4 Claims. (Cl. 72—35)

This invention relates to face block for buildings and method of making the same and the object of the invention is to provide a face block comprising a molded block and an opaque glass face firmly secured thereto.

Another object of the invention is to provide a means for securing the glass face to the block in a manner to firmly lock the glass face to the block, said means being embedded in the block and engaging the edges of the glass panel to hold the same in position on the block.

A further object of the invention is to provide a plastic composition between the glass panel and the block whereby the glass panel is firmly supported and cushioned on the face of the block.

Another object of the invention is to provide a method of forming a face block comprising positioning metal holders about the edge of the glass panel, depositing mastic on the back side of the glass panel within the holders and then molding the block into the holders behind the mastic while the holders are held in firm engagement with the edges of the glass panel.

A further object of the invention is to provide a face block which may be set up in a wall and in which only the faces of the glass panels are exposed to view after the blocks have been pointed up, the holders being embedded in the mortar between the blocks and being thus concealed from view.

Another object of the invention is to provide an arrangement which will support the glass panels against breakage and will also allow expansion or contraction of the same without cracking or loosening the holders and without loosening the glass panels from the blocks.

These objects and the several novel features of the invention are hereinafter more fully described and claimed and the preferred form of construction by which these objects are attained is shown in the accompanying drawing in which—

Figure 1:
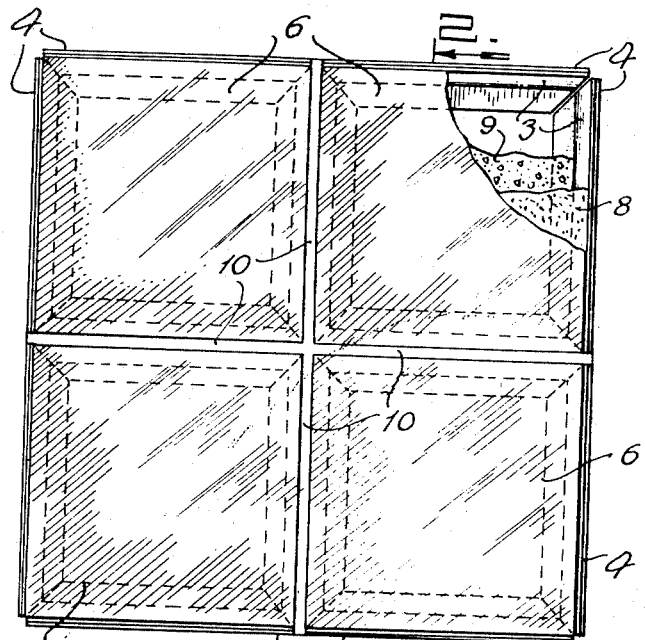
Fig. 1 is a face view of a series of blocks as set in a building wall and pointed up.
Figure 2:
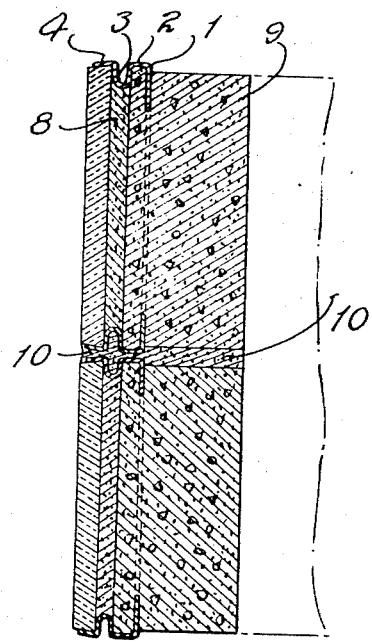
Fig. 2 is a section taken on line 2—2 of Fig. 1.
Figure 4:
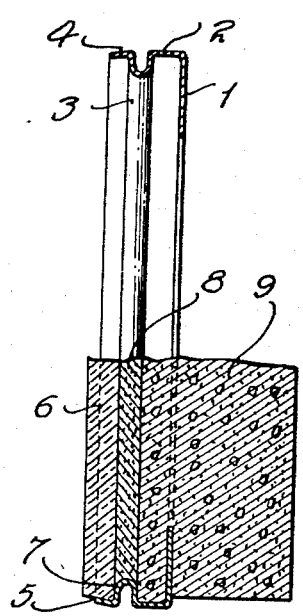
Fig. 4 is a section taken on line 4—4 of Fig. 3.
Figure 5:
Fig. 5 is an edge view of one of the holders.

The holder 1 is shown more particularly in Figs. 4 and 5 and is provided with a flange 2 terminating in a channel portion 3 and this channel portion 3 is provided with a flange 4 extending at a slight angle to fit over the beveled edge 5 of the glass panel 6. This glass panel is preferably opaque in character and may be colored to any desired color. In making the block, the face of the panel 6 is laid on a level surface and four holders 1 are positioned about the four sides of the glass panel so that the side 7 of each channel 3 rests on the back side of the glass panel. Clamping means may then be inserted in the channel 3 of the four holders which are formed of sheet metal and this clamping means should be arranged to hold the angle flanges 4 in firm engagement with the beveled edges of the glass panel 6. Mastic 8 is then deposited on the back side of the glass panel to about the depth of the channel 3 and the moldable block material 9 is then deposited on top of the mastic to cover the mastic and fill the space between the mastic 8 and the flanges 1 of the holders as well as the space within this portion as shown in Figs. 2 and 4. By this arrangement, the flanges 1 of the holder are embedded in the block 9 and this block 9 may be of any moldable material, such as, concrete, concrete and cinders, clay or other suitable moldable material. When the block 9 has set, the holder clamping means may then be removed and the block is ready for use.

The blocks may be built up in a wall by positioning the blocks one above the other in courses in which mortar or other similar compound 10 is utilized between the courses and the front face of the wall is pointed up with a trowel between the edges of the glass panels 6 so as to conceal the sheet metal angle flanges 4 and give the appearance of a wall built up with only the glass panels as the glass panels are the only parts exposed to view. At the same time, by being backed up by a block in this manner, the construction is very firm and rigid and the angle flanges 4 engaging over the slightly beveled edges of the glass panels retain the glass panels in position and prevent them from falling out. Also, the mastic 8 provides a bond between the glass panel and the block and, at the same time, the holders are firmly embedded in the block to thoroughly secure the glass panels to the blocks. In this connection, it will be noted that the mortar fills the mating channels 3 of the adjacent holders and provides a key joint between the blocks as will be understood from Fig. 2. By backing up the glass panels with mastic, a cushion is provided for the glass panels which supports each glass panel throughout its area and also bonds the panel to the block. The channel 3 in each holder 1 provides a semi-yieldable portion which may yield to a certain extent in expansion or contraction and also provides a semi-spring support for the flange 4 which holds the beveled edges of the glass. By the combination of the sheet metal holders and the mastic, the glass is firmly supported but, at the same time, contraction or expansion in any direction is allowed due to the semi-yieldable combination of the separate sheet metal holders and the mastic.

By thus supporting the glass, the face of the glass may be struck a sharp blow without fracture and as each glass panel is supported as a unit with its block, the glass panels are firmly secured in the wall as separate units and thus may be built up on the face of a building to any height desired without the danger of the glass panels becoming loose and falling out of place in the wall to injure persons passing therebeneath.

Figure 3:
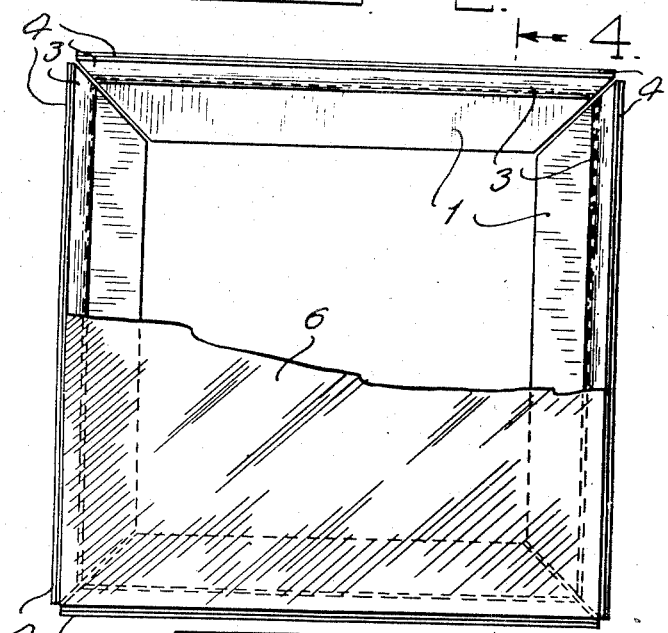
Fig. 3 is a face view of the glass panel and holders, the glass panel being partially broken away to show the holders.

In the rectangular form shown in Fig. 3, it will be noted that four holders 1 are used and this arrangement may be varied to allow pentagonal, hexagonal, octagonal or other shapes of blocks to be made. Due to the fact that the holders are each separate strips, it is necessary to embed the holders in the molded block to secure the holders in position in engagement with the beveled edges of the glass panels. The glass panels may be colored in any color desired and may be also produced in black and white and the different colors may be arranged in any design desired. The blocks may be made in small or large units to carry out any design and are capable of being laid up as blocks in any wall form desired. It is to be noted that the depth or wall thickness of the block 9 may be made to any measurement desired from a comparatively shallow face block to a block which is equal in depth to the full thickness of the wall. Also, while I have suggested glass panels as used for the face of the block, it is also possible to use composition panels or even wood, marble or stone panels as desired in place of the glass panels 6. The sheet metal holders may be made up as separate strips as shown or may be made in continuous lengths and bent to form.

This building block is arranged for supporting any type of panel on the face of the block but is more especially designed to support a glass or fragile panel on the face of the block in which the fragile panel is supported at the edges by the holders and at the back by an asphalt mastic which is applied in an even layer over the back of the panel and thus will give uniform support over the entire area of the panel. By using an asphaltic mastic, the mastic will remain semi-yieldable throughout its life and thus provide a cushion supporting the fragile panel and preventing its breakage. Moreover, fractures in glass with uniform coverage of mastic are very similar to those in safety glass; that is, the glass shatters into small pieces which are easily retained by the mastic and the danger of falling glass are practically eliminated. One of the most important features of the invention is that it removes the restriction which has been placed upon the use of structural glass on building fronts in practically every large city through the use of the angular flange and beveled edge on the structural glass panel which effectively ties the glass facing to the masonry backing and the mastic which prevents small pieces of the glass from falling if the glass is broken. Also, the blocks may be made in thicknesses of four inches or eight inches to bond into the wall and thus answer all code requirements for load bearing walls. This is an important feature, as structural glass is considered at present, as merely a facing material and subject to severe limitations from the building codes of all large cities. The construction of the block is such that no strain is placed upon the glass facing when the blocks are set into the wall and provision has also been made in the layer of asphalt mastic between the glass and block to take care of any differences in expansion between the two materials, thus preventing breakage of the glass panels under expansion or contraction.

From the foregoing description it becomes evident that the block is very simple and efficient to manufacture, may be readily laid up in a wall to provide an integral part of the wall, will not deteriorate due to the fact that the metal holders are all encased in the finished wall and provides a device which accomplishes the objects described.

Having thus fully described my invention, its utility and mode of operation, what I claim and desire to secure by Letters Patent of the United States is—

1. A face block for buildings comprising a molded block, a series of sheet metal holders embedded in the molded block, each holder being provided with an angular flange, a glass panel provided with beveled edges fitting within the angular flanges of the holders and supported on the block thereby and a channel formed in each holder between the back of the glass panel and the block and spacing the glass panel from the block and a layer of mastic filling the space between the glass panel and the block.

2. A face block for buildings comprising a molded block, a series of sheet metal holders embedded in the molded block, each holder being provided with an angular flange, a glass panel provided with beveled edges fitting within the angular flanges of the holders and supported on the block thereby and a channel formed in each holder between the back of the glass panel and the block and spacing the glass panel from the block.

3. A block of the character described, comprising a molded body portion, a face plate covering a surface of the body portion, a series of metal holders embedded in the body portion and having flanges engaging the edges of the face plate for securing said face plate to said body portion, and a channel formed in each metal holder between the back of the face plate and the body portion and spacing said face plate from said body portion.

4. A block of the character described, comprising a body portion of cementitious material, a face plate covering a surface of the body portion, and metal holders for securing said face plate to said body portion, each metal holder comprising an outwardly facing channel portion disposed between the back of the face plate and the body portion and spacing said face plate from said body portion, one wall of said channel portion terminating in a forwardly directed flange engaging the corresponding edge of the face plate and the opposite wall of said channel portion terminating in a rearwardly directed portion embedded in said body portion.

ERLE T. PUTNAM.